Nov. 7, 1933.   H. J. HOLLINGSWORTH   1,933,553
BLOCK AND TACKLE SYSTEM
Original Filed July 30, 1930   2 Sheets-Sheet 1

Inventor
Homer J. Hollingsworth
By Lyon & Lyon
Attorneys

Nov. 7, 1933.   H. J. HOLLINGSWORTH   1,933,553
BLOCK AND TACKLE SYSTEM
Original Filed July 30, 1930   2 Sheets-Sheet 2
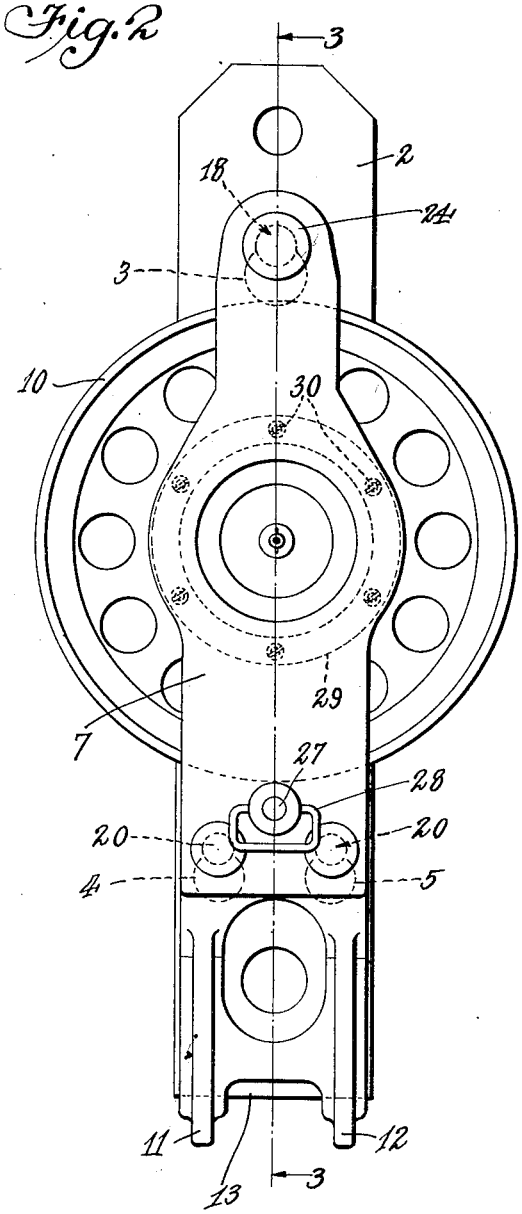
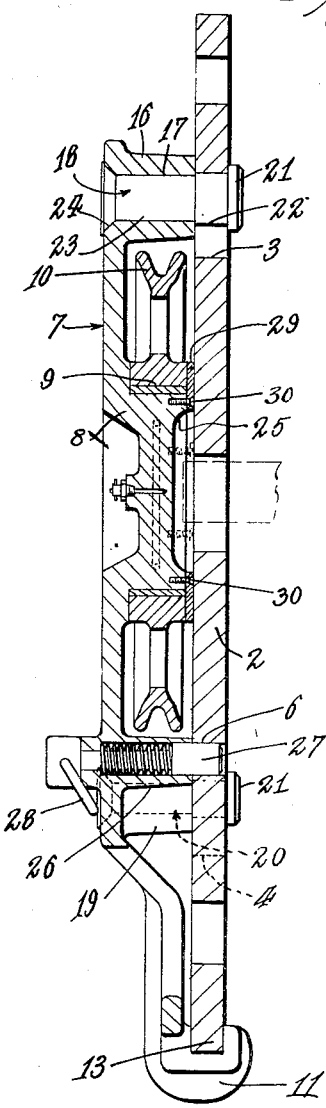
Inventor
Homer J. Hollingsworth
By Lyon & Lyon
Attorneys Patented Nov. 7, 1933

1,933,553

UNITED STATES PATENT OFFICE 1,933,553

BLOCK AND TACKLE SYSTEM

Homer J. Hollingsworth, Lynwood, Calif., assignor to Erle P. Halliburton, Los Angeles, Calif.

Application July 30, 1930, Serial No. 471,697
Renewed November 16, 1931

10 Claims. (Cl. 254—195)

This invention relates to block and tackle systems, and has particular reference to a system employing a traveling block such as is ordinarily used in the drilling of earth bores.

In the drilling of wells such as oil wells, the drill pipe is vertically disposed in the well hole and has its upper end connected to a swivel which in turn is supported by a hook connected with a traveling block. The traveling block is a part of a lines and falls which has its live end connected with a hoisting drum which in the art is called a "rotary drawworks".

As the well is deepened during the drilling operations the weight of the pipe which must be supported by the lines and falls increases and therefore, it frequently becomes necessary to change the number of lines which are used in the lines and falls supporting the pipe.

Commonly, this means a change from six lines supporting a traveling block to eight lines supporting a traveling block. As the traveling block is ordinarily constructed, such a change requires that the traveling block be rethreaded and several hours work is necessary for this purpose.

It is the principal object of this invention to provide a traveling block in which the traveling block is formed with one of its sheaves separable from the remainder, said sheave carrying two lines so that the separable sheave may be detached from the traveling block and secured stationarily relative to the crown block to thus render the lines extending over the detached block dead lines in so far as the block and tackle system is concerned.

Another object of the invention is to provide a traveling block in which one of its sheaves may be separated from the remainder and secured stationarily relative to the crown block to reduce the lines on the traveling block; for example, from eight lines to six lines when the eight-line block is no longer needed, without the necessity of removing the lines or re-threading the lines through the blocks.

A further object of the invention is to provide an attachment for a traveling block which is simple and economical in construction and sturdy and durable in use.

Various further objects and advantages of the present invention will be apparent from a description of a preferred form or example of the invention. For this purpose there is hereafter described with reference to the accompanying drawings one form or example of the invention.

In the drawings:

Figure 2 is an elevation of the attachment in position engaging the side plate of a traveling block.

Figure 3 is a section on the line 3—3 of Figure 2.

Figure 1:
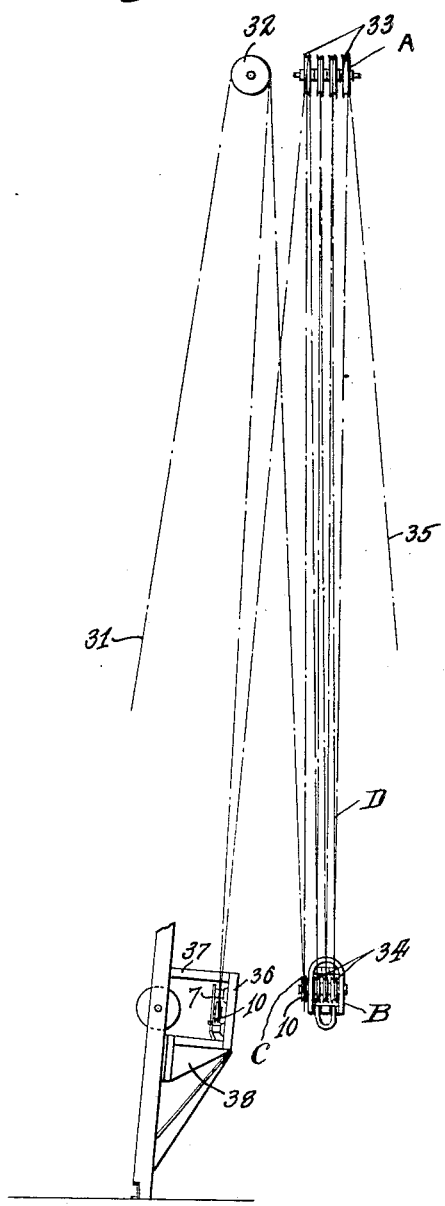
Figure 1 is a diagrammatic view showing the method of threading a block in a lines and falls when the attachment of the present invention is used.

Referring to the drawings, I have illustrated in Fig. 1, a block and tackle system comprising a crown block A which represents the stationary block secured to some stationary portion of the derrick, preferably near the upper end thereof. A main traveling block is illustrated at B, both the main traveling block and the crown block comprising a plurality of sheaves over which ropes may pass, and mounting devices assembling the sheaves of each of the blocks for rotation. The auxiliary block C is illustrated as attachable to the main block B, the auxiliary block being illustrated as comprising a single sheave and a mounting therefor, though it is to be understood that the auxiliary block may be formed with a plurality of sheaves, or may be formed as a plurality of separate sheaves, each with its mounting means. The rope or cable D is illustrated as comprising the lines and falls threaded around all of the sheaves on the crown block A, the auxiliary block C and the main traveling block B, to constitute a complete block and tackle system.

Referring to the drawings, particularly Figures 2 and 3, 2 indicates one of the two side plates comprising the mounting means for the sheaves of an ordinary traveling block constituting the main traveling block B. In an ordinary traveling block a number of sheaves are rotatably mounted upon a bearing member included between two such plates. In order to provide for the attachment of the auxiliary block of the present invention this plate is changed by providing a connection for securing the auxiliary block C to the main block B as by the addition of the upper opening 3 in the form of a bayonet slot and by two lower horizontally spaced apart bayonet slot openings 4 and 5.

The auxiliary block C may be formed of a mounting or body member 7 in the form of a plate having a hub 8 for supporting a bearing 9 for rotatable sheave 10. The body 7 is provided at its lower end with two hook shaped extensions 11 and 12 which are adapted to pass around the lower end 13 of the side plate 2 of the traveling block to which the attachment is to be fixed.

At the upper end the body 7 of the auxiliary block C is provided with means detachably connecting the body to the main traveling block B, illustrated as a boss 16 which has an opening 17 adapted to receive a pin 18. Near the lower end of the attachment body 7 there is provided a pair of bosses 19 having openings to receive the pins. These bosses at their openings are horizontally spaced apart and the three openings are adapted to register with the upper ends of the bayonet slots 3, 4 and 5 in the plate 2 of the main traveling block.

Pins 20 are provided in the bosses 19 of the body 7. These pins are of similar construction and are each formed with a head 21 spaced from the end of their bosses by a cylindrical section 22 from which the pins are reduced, as indicated at 23 and driven into the openings in the bosses. The inner ends of the pins are preferably welded to the body 7, as indicated at 24.

In operation the auxiliary block C or attachment is placed upon the main traveling block by the heads of the pins 18 and 20 passing through the larger parts of the bayonet slots and the attachment is then drawn upwardly until the sections 22 of the pins are in the upper ends of the slots and the plate held firmly between the heads 21 of the pins and the bosses of the attachment. Between the two hook shaped extensions 11 and 12 there is shown an opening 25 which permits the attachment body to pass over the usual pins of the traveling block.

The attachment body is also provided with a boss 26 provided with a bore receiving a spring controlled latch pin 27 which is adapted to engage the opening 6 in the plate 2 and latch the attachment body 7 in position on the traveling block. 28 indicates a handle by means of which the latching pin may be withdrawn from the opening 6 when the attachment is to be separated from the traveling block.

In order to hold the sheave stem on the attachment body 7 when it is separated from the traveling block there is provided a plate 29 held to the body 7 by means of set screws 30.

Now referring more particularly to Figure 1, the preferred manner of threading a main traveling block and the auxiliary block of the present invention is diagrammatically indicated. Preferably, the dead end 31 of the line D leads to one of the sheaves 32 of a crown block and hence to the sheave 10 of the attachment. The line is then passed around the remaining sheaves 33 of the crown block and sheaves 34 of the traveling block and the live end of the line connected, as indicated at 35, to a hoisting drum. At times the attachment bearing the sheave 10 will be disconnected from the block when only a six line block is desired and attached in stationary position relative to the crown block to a plate 36 supported by the well derrick.

By this method of using the attachment sheave or auxiliary block the lines leading to the attachment sheave 10 are, when the sheave is supported by the traveling block, the slowest moving lines of the block. When the attachment sheave or auxiliary block is fixed to the stationary plate 36 in the derrick these lines are dead lines and do not move in operation of the lines and falls.

Figure 4:
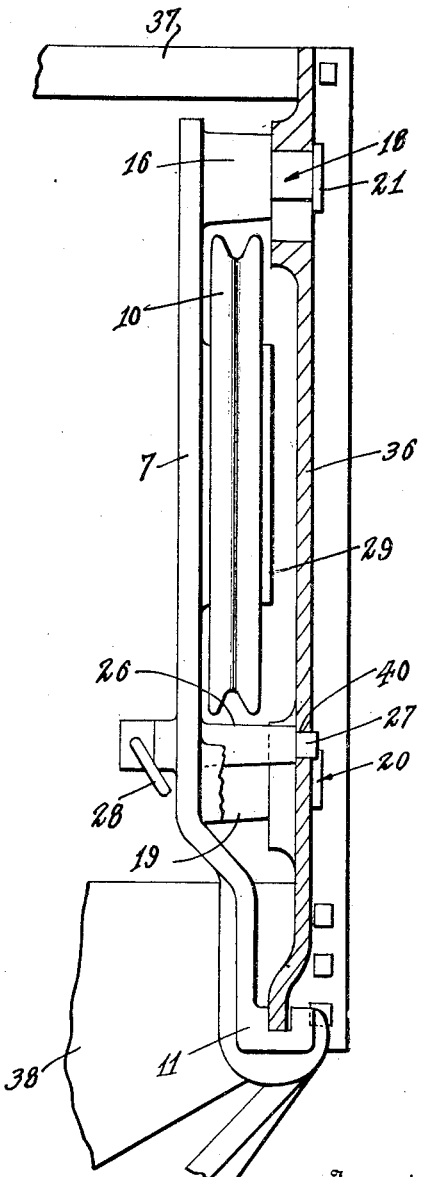
Figure 4 is an elevation of the attachment supported stationarily in the well derrick and showing a plate in section to which it is attached.

Now referring more particularly to Figure 4 where the auxiliary block C is shown connected with the stationary plate 36, this plate 36 is held by brackets 37 and 38 and is generally similar in form to the side plate 2 of the traveling block, being provided with a bayonet slot at its upper end for reception of the upper pin 20 of the attachment and provided with two spaced apart bayonet slot openings at its lower end for receiving the lower pins 20 of the block. It is also provided with an opening 40 for receiving the latch pin 27.

In use of the attachment of the present invention a considerable saving is experienced in the line required for drilling operations and wear on the line is bound to be substantially reduced.

While the particular form of the invention herein described is well adapted for carrying out the objects of the present invention, it is to be understood that I do not wish to be limited to the particular embodiment set forth and the invention is of the scope of the appended claims.

I claim:

1. An attachment for a traveling block comprising a body member having a hub, a sheave mounted to rotate upon said hub, mounting pins at opposite sides of said hub and extending beyond the same for mounting the attachment on the side plate of the traveling block, and a latch member for latching the attachment to said side plate.

2. An attachment for a traveling block comprising a body plate having at one side an extending hub, a sheave mounted upon said hub, attaching pins extending from said body plate beyond said hub, and a hook shape extension at one end of said body plate.

3. An attachment for a traveling block comprising a body plate having an extending hub, a sheave rotatably mounted upon said hub, means for retaining the sheave on said hub, means for attaching said body plate to the side plate of a traveling block, and a spring actuated latching member adapted to engage said side plate for latching the attachment thereto.

4. An attachment for a traveling block comprising a body plate having an extending hub, a sheave rotatably mounted upon said hub, means for retaining the sheave on said hub, means for attaching said body plate to the side plate of a traveling block, and a spring actuated latching member adapted to engage said side plate for latching the attachment thereto, the body plate of the attachment member being provided with a lower hook shape extension for engaging the lower end of the side plate of said traveling block.

5. An attachment for a traveling block comprising a body plate having a central extending hub, a sheave rotatably mounted upon said hub, means for retaining the sheave thereon, bosses above and below said hub extending substantially the same distance of said hub from the body plate, and mounting pins carried by said bosses.

6. An attachment for a traveling block comprising a body plate having a central extending hub, a sheave rotatably mounted upon said hub, means for retaining the sheave thereon, bosses above and below said hub extending substantially the same distance of said hub from the body plate, mounting pins carried by said bosses, and a spring actuated latching pin carried by said body plate.

7. An attachment for a traveling block comprising a body plate having a central extending hub, a sheave rotatably mounted upon said hub, means for retaining the sheave thereon, bosses above and below said hub extending substantially the same distance of said hub from the body plate, mounting pins carried by said bosses, and a hook shape extension for said body plate.

8. An attachment for a crown block comprising a body plate having a hub, a sheave mounted upon said hub, extending bosses above and below said hub, mounting pins supported by said bosses and extending therebeyond, said mounting pins being provided with retaining heads, and a latching pin carired by said body plate.

9. An attachment for a crown block comprising a body plate having a hub, a sheave mounted upon said hub, extending bosses above and below said hub, mounting pins supported by said bosses and extending therebeyond, said mounting pins being provided with retaining heads, a latching pin carried by said body plate, and a hook shape extension from said body plate.

10. In a traveling block, a main block having a pair of spaced strap plates, a bearing journaled in said strap plates and one or more sheaves mounted upon said bearing between said strap plates, an auxiliary block comprising an operative unit including a mounting plate and a sheave rotatably mounted thereon, means on said mounting plate for detachably securing said plate to one of the strap plates of said main block whereby said auxiliary block and said main block may be operated together as a unit, and stationary means remote from said main block for receiving said detachably securing means to stationarily mount said auxiliary block to operate as a unit independent of said main block when said auxiliary block is detached from said main block.

HOMER J. HOLLINGSWORTH.